United States Patent [19]
Wilk

[11] Patent Number: 4,877,406
[45] Date of Patent: Oct. 31, 1989

[54] MANIPULATABLE, SPHERICAL EDUCATIONAL AND AMUSEMENT DEVICES

[76] Inventor: Howard J. Wilk, 1600 Church Rd. Apt. A307, Wyncote, Pa. 19095-1920

[21] Appl. No.: 267,215

[22] Filed: Nov. 4, 1988

[51] Int. Cl.$^4$ .................. G09B 23/26; A63F 9/08
[52] U.S. Cl. .................. 434/278; 273/153 S
[58] Field of Search .................. 434/278; 273/153 S, 273/155

[56] References Cited

U.S. PATENT DOCUMENTS

| | | |
|---|---|---|
| 133,620 | 12/1872 | Benedict . |
| 1,446,164 | 2/1923 | D'Eyraud . |
| 2,841,427 | 7/1958 | Sheppard . |
| 3,081,089 | 3/1963 | Gustafson .................. 273/153 S |
| 3,317,209 | 5/1967 | Dixon . |
| 3,510,962 | 5/1970 | Sato . |
| 4,378,218 | 3/1983 | Fletterick et al. . |
| 4,478,418 | 10/1984 | Sherman, Jr. et al. .......... 273/153 S |

FOREIGN PATENT DOCUMENTS

| | | |
|---|---|---|
| 1147143 | 5/1983 | Canada . |
| 1345514 | 1/1963 | France . |

OTHER PUBLICATIONS

Noller, "A Simple Apparatus to Demonstrate Walden Inversion", 24 *J. Chem. Educ.* 277 (Jun. 1947).
Nyquist, "A Simple Model for the $S_N2$ Mechanism", 42 *J. Chem. Educ.* 103 (Feb. 1965).
Hamon, "A Model to Demonstrate the Walden Inversion", 47 *J. Chem. Educ.* 398 (May 1970).
Sone and Sone, "$S_N1$ and $S_N2$ Reactions: Paper Marionette for Demonstration", 50 *J. Chem. Educ.* 615 (Sep. 1973).
Newman, "A Molecular Model for $S_N2$ Reactions", 52 *J. Chem. Educ.* 462 (Jul. 1975).
Anderson, "Two Working Models for the $S_N2$ Mechanism", 64 *J. Chem. Educ.* 1023 (Dec. 1987).
Berry and Botterill, "A Molecular Model to Demonstrate Walden Inversion", 4 *Educ. Chem.* 139 (May 1967).
Meek, "Models for Demonstrating Overlap and Intermolecular Repulsions", 48 *J. Chem. Educ.* 112-113 (1981).
Gootjes and Bakuwel, "Dreiding Model of a Reversible Nitrogen Atom", 42 *J. Chem. Educ.* 407 (Aug. 1965).
Abstract of Article by Skvortsov, Jones and Elvidge, "Invertible Nitrogen Atomic Models", *Chem. Ind.* (London) 105-6 (1969) (4).

*Primary Examiner*—Edward M. Coven
*Assistant Examiner*—Valerie Szczepanik
*Attorney, Agent, or Firm*—Panitch, Schwarze, Jacobs and Nadel

[57] ABSTRACT

A device for use as a molecular model or manipulable puzzle includes at least two concentric spheres rotatable with respect to one another and a plurality of at least six inserts extending radially through the concentric spheres. Each of the spheres has at least two great circle channels crossing one another, preferably perpendicularly, each great circle channel receiving at least one and preferably four of eight inserts. The outer spheres are formed by separate, approximately quarter sphere, curved segments which are held together by the inserts. The concentric spheres can be made to rotate with respect to one another by movement of the inserts. In the preferred embodiments, eight inserts are arrangable in cubic orientations forming two sets of four, tetrahedrally oriented inserts. Three inserts of each set can be manipulated from a tetrahedral orientation with respect to the fourth insert of the set to a tetrahedral orientation with respect to an insert of the other set diametrically opposed to the fourth insert. Unique indicia on the surface of the outer sphere and on cover member portions of the inserts can be used to provide a manipulatable puzzle.

20 Claims, 6 Drawing Sheets

MANIPULATABLE, SPHERICAL EDUCATIONAL AND AMUSEMENT DEVICES

FIELD OF THE INVENTION

The invention relates to manipulatable, spherical educational and amusement devices and, in particular, to manipulable devices which may be used as models for certain chemical reaction mechanisms, namely Walden inversions, and as puzzles.

BACKGROUND OF THE INVENTION

Molecular models are widely used by practicing chemists, and by students and teachers of chemistry. One reaction mechanism that widely occurs is the Walden inversion, also known as atomic inversion or stereochemical inversion. This is a reaction mechanism that obtains for a great many chemical reactions, most of which are known as bimolecular nucleophilic substitution ($S_N2$) reactions. This reaction mechanism must be learned by every student of organic chemistry and is widely described in textbooks on the subject, for example, Roberts & Caserio, *Basic Principles of Organic Chemistry*, 2d Ed., W. A. Benjamin (pub.), Menlo Park, Calif. (1977).

$S_N2$ reactions, as well as various models for exhibiting these reactions, have been disclosed in, among others, the following articles: Noller, "A Simple Apparatus to Demonstrate Walden Inversion", 24 *J. Chem. Educ.* 277 (June 1947); Nyquist, "A Simple Model for the $S_N2$ Mechanism", 42 J. Chem. Educ. 103 (February 1965); Hamon, "A Model to Demonstrate the Walden Inversion", 47 *J. Chem. Educ.* 398 (May 1970); Sone and Sone, "$S_N1$ and $S_N2$ Reactions: Paper Marionette for Demonstration", 50 *J. Chem. Educ.* 615 (September 1973); NeWman, "A Molecular Model for $S_N2$ Reactions", 52 *J. Chem. Educ.* 462 (July 1975); Anderson, "Two Working Models for the $S_N2$ Mechanism", 64 *J. Chem. Educ.* 1023 (December 1987); Berry and Botterill, "A Molecular Model to Demonstrate Walden Inversion", 4 *Educ. Chem.* 139 (May 1967).

When four atoms are attached to a central carbon or other atom with single bonds, they normally assume a tetrahedral configuration around the central atom. During a Walden inversion, a fifth atom attaches itself to the central atom opposite one of the four single-bonded atoms, displacing the one atom. At the same time, the remaining three original atoms rotate away from the new, fifth atom to establish a tetrahedral configuration with respect to the fifth atom.

One of the significant disadvantages inherent in all known previous molecular models is that such inversions could be demonstrated with respect to only one axis. Therefore, it was impossible to demonstrate, with a single model, sequential inversions which occur along different axes around the central atom without disassembling and reconstructing the model so as to be properly oriented around the next inversion axis.

SUMMARY OF THE INVENTION

Briefly stated, the present invention is an educational device which comprises first sphere means for defining at least first and second crossing great circle channels, second sphere means concentrically surrounded by the first sphere means for defining at least third and fourth great circle channels crossing each other and crossing under the first and second great circle channels, and a plurality of inserts extending radially at least from the second sphere means through the first sphere means. A first channel portion of each insert is movable along one of the first and second great circle channels. A second channel portion of each insert is simultaneously movable along one of the third and fourth great circle channels. The plurality of inserts are arranged such that each of the great circle channels receives at least one of the inserts. At least one of the first and second sphere means is rotatable with respect to the other of the sphere means through movement of the inserts.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings.

DESCRIPTION OF PREFERRED EMBODIMENTS

Referring to the drawings, like numerals are employed for the indication of identical elements throughout.

Figure 1:
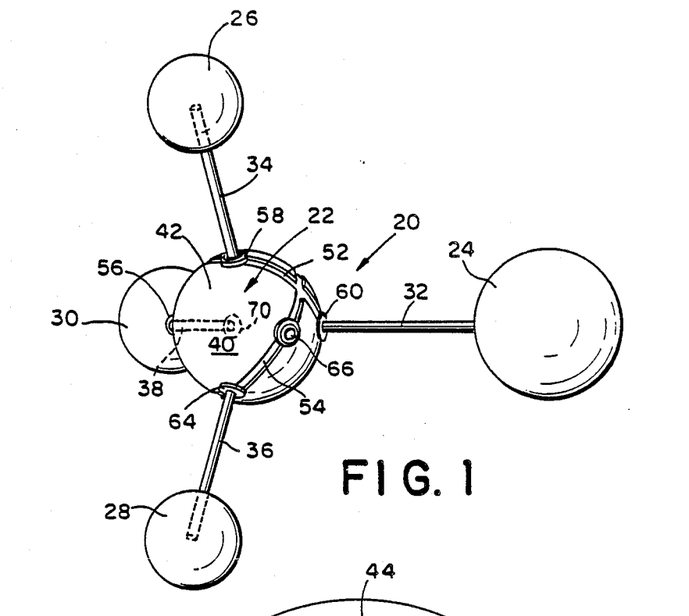
FIG. 1 depicts diagrammatically a preferred embodiment of the invention adapted for modeling chemical reactions.

FIG. 1 depicts diagrammatically a molecular model 20 including a preferred embodiment device 22 of the invention configured as a model atom. In addition to the device 22, the modeled molecule 20 includes four rod-like members 32, 34, 36 and 38, removably attached to the device 22 and supporting at their ends opposite the device 22 four additional spherical members 24, 26, 28 and 30. The four spherical members 24-30 represent additional atoms while the rod-like members 32-38 represent chemical bonds between those additional atoms 24-30 and the device 22. The modeled molecule 20 might be, for example, methyl chloride where the device 22 represents a central carbon atom, model atom 24 represents a chlorine atom and each of the model atoms 26 through 30 represents a hydrogen atom. The lesser included angle between the rod-like member 32 supporting the "chlorine" atom 24 and each of the remaining rod-like members 34, 36, and 38 supporting "hydrogen" atoms 26-30 is a tetrahedral angl, approximately 109°. The lesser included angle between each pair of the rod-like members 34, 36 and 38 supporting the "hydrogen" atoms 26, 28 and 30 is also a tetrahedral angle, i.e. approximately 109°. The three rod-like members 34, 36 and 38 are uniformly angularly spaced from one another at 120° angles around the axis coincident with member 32.

FIG. 1 reveals the outer surface 40 of a first or outermost sphere means 42 of the device 22. The first sphere means 42 is provided by four curved segments, like segments 44, 46, 48 and 50 depicted in FIG. 2. Each of the segments 44-50 is approximately a onequarter portion of a hollow sphere. The four segments 44-50 forming the first sphere means 42 are spaced from one another along their edges to define with their edges first and second great circle channels 52 and 54 (see FIG. 1), respectively, encircling the device 22 and crossing one another, preferably by intersecting one another perpendicularly. Arrayed along the first great circle channel 52 are three inserts 56, 58 and 60. A fourth insert 62, not seen in FIG. 1 but indicated geometrically in FIGS. 3-6, is positioned diametrically opposed to the insert 58 on the side of the device 22 hidden from view in FIG. 1. The spacings between the two inserts 56 and 58 and between the third insert 60 and fourth insert 62 (hidden in FIG. 1) in the first great circle channel 52 are equal and are further equal to the spacings between the two visible inserts 64 and 66 in the second great circle channel 54 and between the third and fourth inserts 68 and 70, respectively, of the second great circle channel, which are hidden in FIG. 1 but indicated geometrically in FIGS. 3-6. The five visible inserts 56-60, 64 and 66 and the three hidden inserts 62, 68 and 70 are arrayed in the device 22 so as t be located at the vertices of imaginary cubes contacting the first sphere means 42 and each inner sphere means of the device 22, to be described. This is depicted geometrically in FIGS. 3 through 6.

Figure 5:
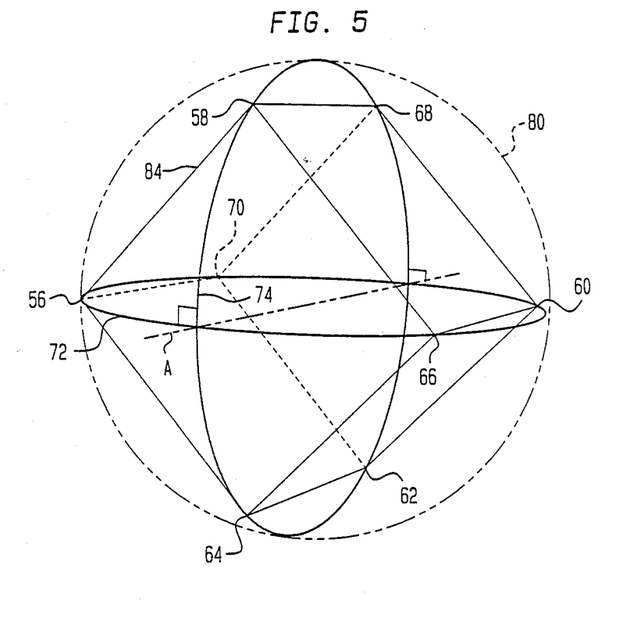
FIG. 5 depicts geometrically third and fourth perpendicularly crossing great circle channels of FIG. 3 provided by a second sphere means of the device of FIG. 1.

Within the first sphere means 42 is a second sphere means 80, indicated geometrically in FIG. 5, which is concentrically surrounded by the first sphere means 42 and which defines at least third and fourth great circle channels 72 and 74, respectively, crossing each other, preferably by intersecting one another perpendicularly, and crossing under the first and second great circle channels 52 and 54. The device 2 further preferably includes a third sphere means 82, indicated in phantom in FIG. 6, which is concentrically surrounded by the first and second sphere means 42 and 80 and defines at least fifth and sixth great circle channels 76 and 78 crossing each other, preferably by intersecting one another perpendicularly, and crossing under the first, second, third and fourth great circle channels. The second sphere means is preferably formed by four separate approximately quarter sphere segments, like the segments 44-50 of FIG. 2, although having a slightly smaller radius of curvature than the segments employed to form the first sphere means 42. The third sphere means 82 is preferably provided by a spherical member with great circle channels 76 and 78 formed in and exposed on its outer spherical surface.

Figure 3:
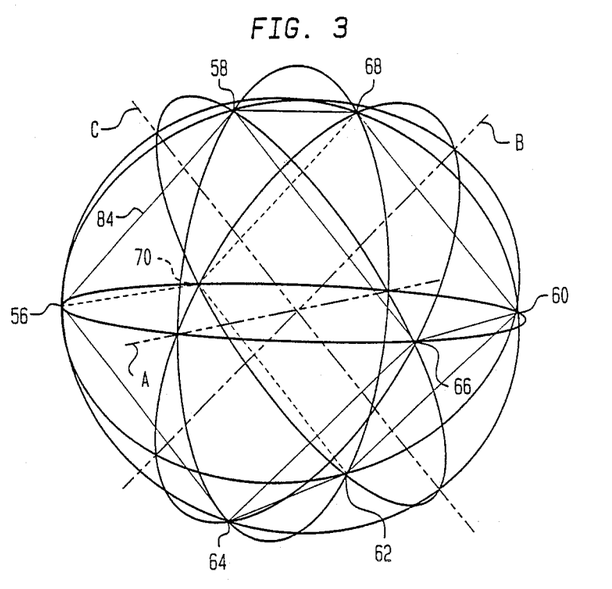
FIG. 3 is a geometric representation of the six crossing great circle channels of the device of FIG. 1.
Figure 4:
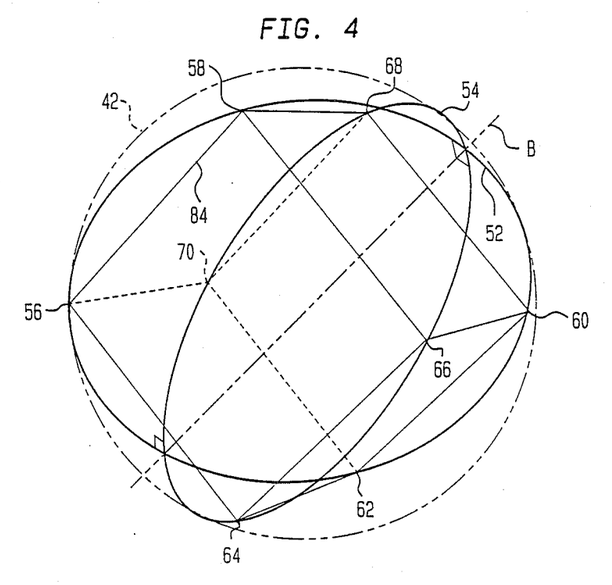
FIG. 4 depicts geometrically first and second perpendicularly crossing great circle channels of FIG. 3 provided by a first sphere means of the device of FIG. 1.
Figure 6:
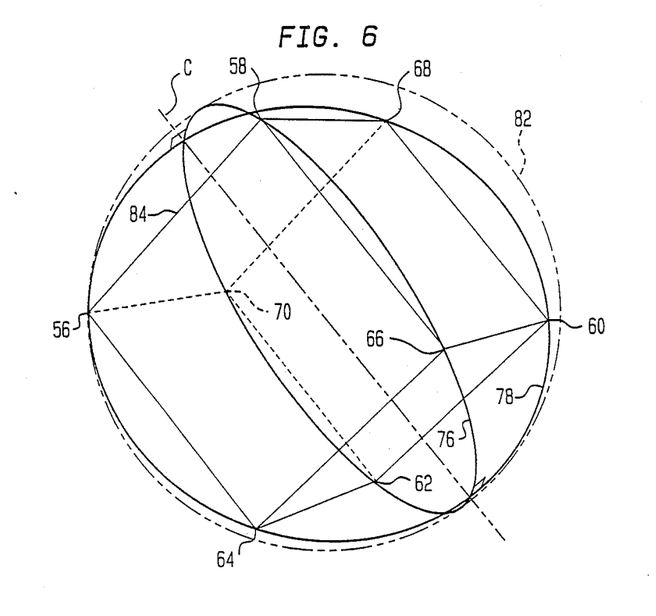
FIG. 6 depicts geometrically fifth and sixth perpendicularly crossing great circle channels of FIG. 3 provided by a third sphere means of the device of FIG. 1.

FIG. 3 depicts geometrically the arrangements of the six great circle channels 52, 54, 72, 74, 76 and 78, respectively, as defined by the three concentric sphere means 42, 80 and 82 of the device 22. Axes A, B and C extend radiallY through an intersection of each pair of perpendicularly intersecting great circle channels: 52, 54; 72, 74; and 76, 78. When the inserts 56-70 are arranged in the cubic orientation depicted in FIGS. 3-6, with each of the inserts 56-70 located at a corner of an imaginary cube 84, the three axes A, B and C are orthogonal. The corners of the cube 84 have been identified in the FIGS. 3-6 with the reference numbers of the eight inserts 56-70. Each of the corners of the cube 84 intersects at the crossing point of three great circle channels, one from each of the three sphere means 42, 80 and 82. As is best seen in FIGS. 4-6, each of the great circle channels 52, 54 and 72-78 thus receives four of the inserts 56-70. In the depicted cubic orientation, there are three possible angular relationships among the inserts 56-70: antipodal (180°), tetrahedral (2 arctan $\sqrt{2}$ or about 109°) and the supplement to the tetrahedral angle (2 arccot $\sqrt{2}$ or about 71°). In FIG. 1, the bonded inserts, i.e. inserts 58, 60, 64 and 70 receiving rod-like members 34, 32, 36 and 38, respectively, and the remaining, unbonded inserts 56, 62, 66 and 68 constitute separate, mutually exclusive sets of tetrahedrally positioned inserts. Each insert of each set subtends the tetrahedral angle (about 109°) with each other insert of the same set. Each insert of each set further diametrically opposes an insert of the other set. It further subtends the supplement to the tetrahedral angle (about 71°) with each of the three remaining inserts of that other set. These are the three inserts most closely adjoining it. Each of the two intersections of the pairs of great circle channels of each sphere means evenly bisects two tetrahedral angles.

Figure 7:
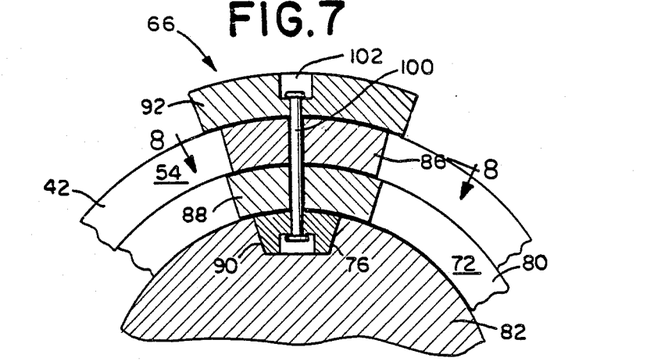
FIG. 7 depicts diagrammatically an elevation view of one of the inserts of the device of FIG. 1.

Preferably the construction of each of the inserts 56-70 is identical. FIG. 7 reveals a preferred construction of one of the inserts, insert 66, and of the relationship of the insert to each of the three sphere means 42, 80 and 82. The insert 66 in FIG. 7 includes a first channel portion in the form of a first member 86 which is received in and moves along the second great circle channel 54 of the first sphere means 42. A second channel portion of the insert 66 in the form of a separate, second member 88 is received in and moves along the third great circle channel 72 of the second sphere means 80. A third channel portion in the form of a separate, third member 90 is received in and moves along the fifth great circle channel 76 defined by the third sphere means 82. The insert 66 is viewed in FIG. 7 looking down the fifth great circle channel 76. The insert 66 further includes an outermost portion in the form of a fourth or cover member 92 positioned radially outwardly with respect to the first member 86. Preferably, the cover member 92 is generally disk-shaped and has a diameter greater than the width of the second great circle channel 54 on the first outermost sphere means 42. Preferably, the first and fourth members 86 and 92 of each of the eight inserts 56-70 hold the curved segments forming the first sphere means 42 together. The four approximately quarter sphere curved segments forming the second (intermediate) sphere means 80 are trapped between the segments forming first sphere means 42 and the single spherical member forming the third (innermost) sphere means 82, keeping the device 22 together while permitting relative rotation of the sphere means 42, 80 and 82 with respect to one another. A central dowel 100 extending between the third (inner-most) and cover (outermost) members 90 and 92 and through each of the intermediate first and second members 86 and 88 is preferably provided in each insert as coupling means for coupling the first, second and third members 86, 88 and 90 together for rotation with respect to one another and, preferably, with respect to the cover member 92. The central dowel 100 of each insert provides a common axis of rotation for each of the three members 86, 88 and 90. A recess 102 (in phantom) is provided in the fourth (cover) member 92 of the insert for removably receiving and supporting in a cantilever manner a rod-like member like one of the rod-like members 32-38 extending radially outwardly from the device 22 for coupling model atoms to the device 22. The central dowel 100 may be fixedly joined to the fourth (cover) member 92 or to any other member 86-90. The dowel 100 may be free to rotate with respect to all members 86-92, but preferably is rotatable with respect to any three of the four members 86-92 to permit the relative rotation between each of the members 86-92. Preferably, each of the first, second and third members 86, 88 and 90 of each insert 56-70 is also configured so as to travel in only the great circle channel within which it is initially received. This can be done, for example, by providing each of the first, second and third members 86-90 with a longer dimension generally parallel to the great circle channel within which it travels and a shorter dimension which is perpendicular to the longer dimension and transverse to that great circle channel. The first, second and third members 86, 88 and 90 are rotatable with respect to one another to allow relative rotation of the sphere means 42, 80 and 82 with respect to one another while the inserts 56-70 are being manipulated to pass along and transverse to the great circle channels within which they are received. It is suggested that the maximum arc subtended by each of the inserts in the device 22 be no greater than about 60° to prevent possible interference of the inserts 56-70 during their movement.

Figure 8:
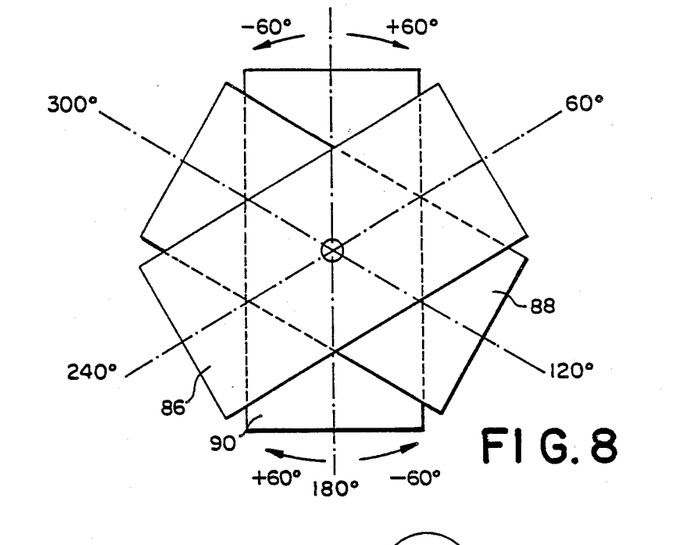
FIG. 8 depicts diagrammatically a top plan view of the insert of FIG. 7 taken along the lines 8—8.

The cubic arrangement of the eight inserts 56-70, depicted in FIGS. 1 and 3 through 6, is preferred for demonstration of the walden inversion. To assist in achieving that orientation of the device 22, each of the inserts 56-70 is further provided with means for biasing the three members 86-90 of each insert to predetermined angular orientations with respect to one another, in particular, angular orientations which are multiples of 60°, to match the ±60° angular orientation of the great circle channels crossing one another at each of the eight corner points formed in the cubic arrangement of the inserts 56-70. One of these preferred angular orientations can be seen in FIG. 8, a plan view of the first through third members of the insert. A means for biasing, which is preferred for its simplicity, is now described in detail with respect to FIGS. 9 through 12.

Figure 9:
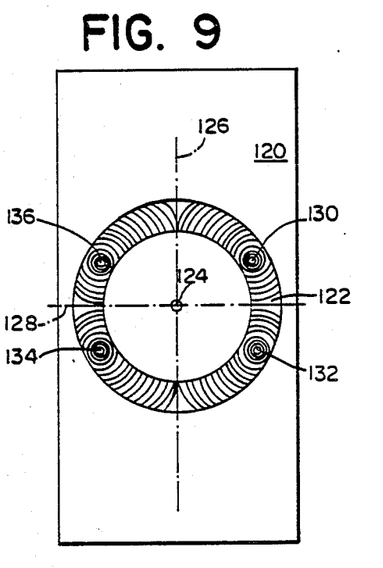
FIG. 9 depicts diagrammatically a bottom plan view of one side of one of the members of the insert of FIG. 7.

FIG. 9 depicts a bottom plan view of the lower surface (radially innermost surface) 120 of the first member 86 of each of the inserts 56-70. The lower suraace 120 includes an annular track 122 concentrically positioned with respect to the dowel hole 124 defining the axis of rotation of the member 86. The lower surface 120 is generally rectangular in shape having a major central axis 126, which is generally parallel to the first or second great circle channel in which the member 86 is received, and a minor central axis 128, also passing through dowel hole 124, which is generally perpendicular to the great circle channel in which the member 86 is received and the major central axis 126. Uniformly spaced at about 60 angular positions on either side of the major axis 126, above and below the central dowel hole 124 in FIG. 9, are four depressions 130-136 in the annular track 122. Taking the portion of the major central axis 126 extending upward from the dowel hole 12 in FIG. 9 as the origin, depressions 130, 132, 134 and 136 are spaced at 60°, 120°, 240° and 300° angular positions from that origin. The annular track 122 slopes downwardly on either side of the four points where the track 122 is crossed by the major and minor central axes 126 and 128 to the adjoining depressions 130-136.

Figure 10:
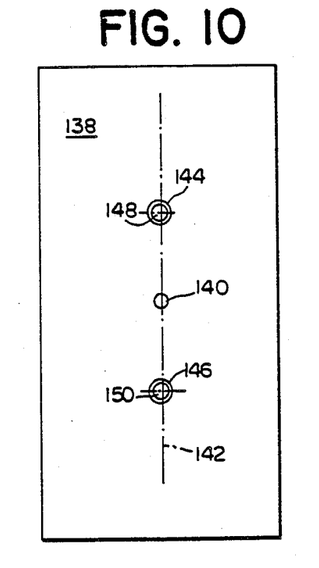
FIG. 10 depicts diagrammatically a top plan view of an opposing side of another member of the insert of FIG. 7 adjoining the one member depicted in FIG. 9.
Figure 11:
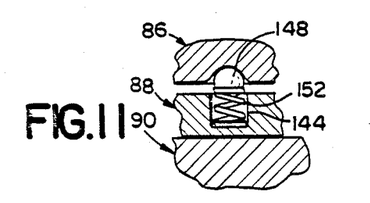
FIG. 11 depicts diagrammatically an elevation, sectioned view of a preferred alignment of the two adjoining members of the insert of FIG. 7 which are separately depicted in FIGS. 9 and 10.
Figure 12:
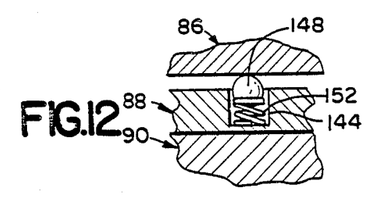
FIG. 12 depicts diagrammatically an elevation, sectioned view of the two adjoining members of FIG. 11 between aligned positions of those members.

FIG. 10 depicts a top plan view of the upper surface 138 of the second member 88 of each of the inserts 56-70. The second member 88 also includes a central dowel hole 140 and a major central axis 142 extending through the central dowel hole 140 which is parallel to the direction of the third or fourth great circle channel receiving that member 88. Two circular bores 144 and 146 are provided diametrically opposed to one another along the major central axis 142 spaced from the central dowel hole 140 a distance equal to the radius of the annular track 122 of the first member 86 (see FIG. 9). Each bore 144 and 146 receives a spherical bearing 148 and 150, respectively. As is depicted in FIGS. 11 and 12, the bearing 148 is outwardly biased from bore 144 by a spring 152. Bearing 150 is similarly biased from bore 146 by a spring (not depicted). The annular track 122, depressions 130-136, circular bores 144 and 146, bearings 148 and 150, spring 152 and the undepicted spring of bore 146 biasing bearing 150 together constitute the means for biasing the two members 86, 88 of each insert to ±60°(or 60°, 120°, 240° and 300°) angular orientations with respect to one another, as determined by the included angles between the major (or minor) central axes of members 86 and 88. Stated another way, the biasing means biases each of the members 86 and 88 to any of a plurality of angular orientations with respect to one another, again as determined by the included angles between the major (or minor) central axes, at multiples of 60°. The system of great circle channels 52, 54 and 72-78 is so deterministic that the alignment of the two members 86 and 88 (or any two of the three members 86-90) at ±60° angular orientations with respect to one another will orient the third member 90 at a ±60° angular orientation with respect to the other two members 86 and 88.

FIG. 11 depicts the alignment of one of the depressions 130–136, depression 130, along the annular track 122 of the first member 86 with one of the circular bores 144, 146 of the second member 88, bore 144, which occurs at a relative orientation of −60° of the second member 88 with respect to the first member 86. In the aligned orientation depicted, each of the bearings 148 and 150 fits into one of the depressions 130 and 134, respectively, on the first member 86 which is aligned with one of the circular bores 144 and 146. Any other orientation other than a ±60. orientation between first and second members 86 and 88 forces the bearings 148, 150 into the circular bores 144 and 146, as is indicated diagrammatically in FIG. 12 with respect to bearing 148 in bore 144, causing more compression of the spring 152 and of the other spring (not depicted) biasing the bearing 150. This compression changes gradually and reaches a maximum when bearings 148 and 150 cross the major or minor central axes 126, 128. Thus, the force of the springs biasing bearings 148, 150 must be overcome to move the inserts 56–70 of the device 22 from a cubic orientation, one of which is depicted in FIGS. 1 and 3–6, in which the first and second members 86 and 88 of each of the inserts 56–70 are oriented at angular orientations of ±60° with respect to one another. Once a cubic orientation of the device is achieved, the inserts tend to remain in that cubic orientation. Of course, the biasing of any two or of all three of the first, second and third members 86–90 of each of the inserts 56–70 to relative orientations of ±60° with respect to one another tends to bias the device 22 into a cubic orientation of the inserts 56–70. While one biasing means preferred for its simplicity has been described, numerous other variations are possible.

Figure 13:
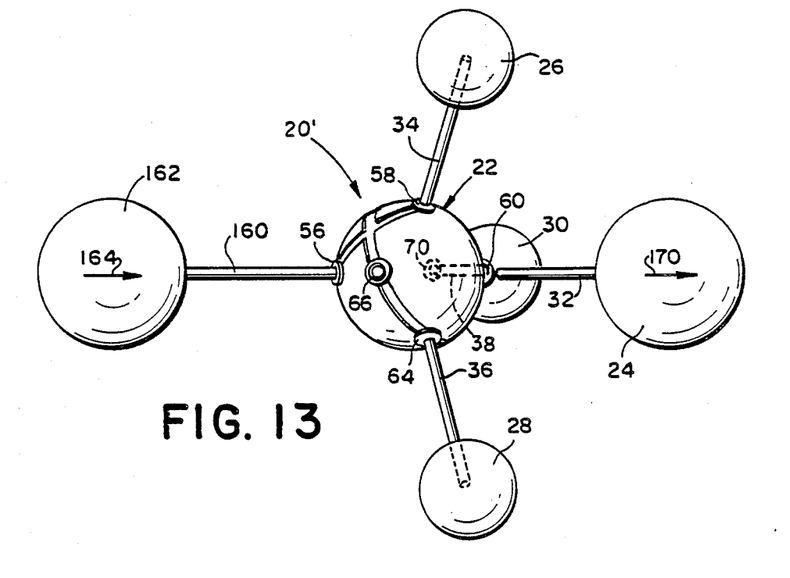
FIG. 13 depicts diagrammatically the device of FIG. 1 after inversion.

Use of the device 22 to demonstrate the Walden inversion will now be explained with respect to, for example, the reaction of a methyl chloride molecule 20 modeled in FIG. 1 with a hydroxide ion to yield methyl alcohol 20' and a chloride ion. Referring to FIG. 13, to simulate the reaction, a rod-like member 160, representing a chemical bond, bearing a sphere 162, modeling an oxygen atom of a hydroxide ion (only partially depicted in FIG. 13), is inserted in the direction of arrow 164 into the recess 102 of the cover member 92 of insert 56, diametrically opposed to insert 60 supporting the modeled chlorine atom 24. Any or all of the three inserts 58, 64 and 70 supporting each of the three modeled hydrogen atoms 26, 28 and 30, respectively, can be pushed away from insert 56 and/or pulled towards insert 60 by means of the rod-like member "bonds" 34–38 (or their supported "atoms" 26–30) from their original position in a tetrahedral orientation with respect to insert 60 towards the position of insert 60 until those inserts 58, 64 and 70 (in phantom) are in a new cubic orientation with the remaining five inserts. This new cubic orientation is depicted diagrammatically in FIG. 13 in which those three inserts 58, 64 and 70 are now in a tetrahedral orientation with respect to insert 56. The view of the device 22 in FIG. 13 has been slightly rotated from that in FIG. 1 to depict insert 56. The modeled chlorine atom 24 and its supporting rod-like member 32 are removed from the device 22 in the direction indicated by arrow 170 in the figure. The model 20 has thus undergone a Walden inversion between FIGS. 1 and 13. During the inversion, the inserts 56 and 60 remained stationary and diametrically opposed. Each of the inserts 58, 64 and 70, supporting the modeled hydrogen atoms 26–30, has rotated approximately 39° from a position forming a tetrahedral angle of about 109° with respect to insert 60 to a position forming a tetrahedral angle of about 109° with respect to insert 56. Movement of the inserts 58, 64 and 70 as described causes relative movement of the three sphere means 42, 80 and 82 which forces each of the three remaining inserts 62, 66 and 68 to swing automatically and in concert between proximal pairs of the inserts 58, 64 and 70, through approximately 39° rotations, to new positions depicted in FIG. 13, tetrahedrally oriented with respect to insert 60. During this inversion of the device 22, each of the inserts 56–70 has moved relatively with respect to each of the three great circle channels receiving it. In several cases, the movement along a particular channel is only an oscillation, i.e. a movement away from and back towards the original position of the insert in the channel. Moreover, all four pairs of diametrically opposed inserts (56 and 60, 58 and 62, 64 and 68, and 70 and 66) remain diametrically opposed during the inversion. Chemically, the molecule 20 has inverted along the HO-C-Cl (inserts 56–60) axis. The resulting methyl alcohol molecule 20', partially depicted in FIG. 13, can be subjected to further reactions in which a nucleophile droxide has been converted to, for example, a tosylate (TsO) group, the nucleophile becoming attached to the device 22 at insert 60, displacing the tosylate, with an inversion of configuration along the now TsO-C-Nu axis, the same axis as the HO-C-Cl axis.

TABLE I

One of the best uses for molecular models is in illustrating "chirality," or handedness, a property of all the molecules depicted in TABLE I, above. The dimensionality of the molecules is indicated by picturing bonds pointed up out of the plane of the paper as ▬ and bonds pointed down from the plane of the paper as ⋯ model carbon atom of the present invention, like device 22 of FIGS. 1 and 13, is represented simply by the "*"

symbol for clarity. Molecules 1 through 7 are chiral; for each of the molecules 1 through 6 another molecule exists which is related to the pictured molecule as the left hand is related to the right. Both enantiomers—"-hands"—of molecule 7 are depicted as 7-R and 7-S. Molecules 1 and 2 have two "chiral centers" (C and *); molecules 3 through 7 have one (*). C becomes achiral in reaction B.

In reaction A, a Walden inversion at * takes lace, with the *-O axis the stationary axis. Et (an ethyl group) becomes attached to * along the *-O axis as the *-O bond breaks. The resulting *-Et axis is the same axis as the *-O axis of molecule 1. The moving axes in this reaction are the *-C, *-H, and *-D axes.

Reaction C is interesting in that although one of the four atoms attached to * changes in going from 3 to 4 (from C to an 0 (oxygen)), this reaction is known to proceed with stereochemical retention rather than inversion (an oxygen atom cleanly inserts itself between C and *). Reaction D is also stereochemically interesting. A seemingly plausible reaction mechanism for the reaction of an acetate ester such as 4 with KOH, the first mechanism that comes to mind for most beginning students of organic chemistry, has OH$^-$ displacing AcO$^-$ (acetate) from *, with an inversion of configuration. In fact the reaction proceeds with retention and isotopic labeling studies have proved that the oxygen atom of molecule 5 is the oxygen atom of the AcO of molecule 4 and not the oxygen atom of the reactant KOH. Students can construct molecular models of 4, manipulate the models to simulate various proposed reaction mechanisms for reaction D (simulating the Walden inversion if the reaction mechanism calls for it), compare the molecular models that result from the various reaction simulations with a model of the molecule that is known to be the actual product (molecule 5), and thus deduce the correct reaction mechanism or at least weed out some of the proposed mechanisms as being at variance with the facts.

In reaction F another Walden inversion takes place at *, with I$^-$ displacing TsO$^-$ along the *-OTs axis creating the *-I axis. The stationary axis in this inversion is the *-OTs/*-I axis while the *-Et axis is on of the three moving axes. Note that the *-Et axis was the stationary axis in the previous Walden inversion (reaction A), whereas the *-OTs axis (then called the *-C axis—the groups attached along the axis have undergone several changes but the axis remains the same) was one of the three moving axes of reaction A. This change of stationary axis from inversion to inversion can not be simulated by any other known model. If excess I$^-$ is used in reaction F more Walden inversions can take place, as in G, with one I$^-$ displacing another along the *-I axis. Eventually, there will be a 50:50 mixture of molecules 7-R and 7-S. Molecules 7-R and 7-S are mirror images of each other and are identical but for their handedness. It is further noted that the device could be used to represent the C atom of molecules 1 and 2 but could not accurately represent the C atom in molecules 3 and 4.

Figure 14:
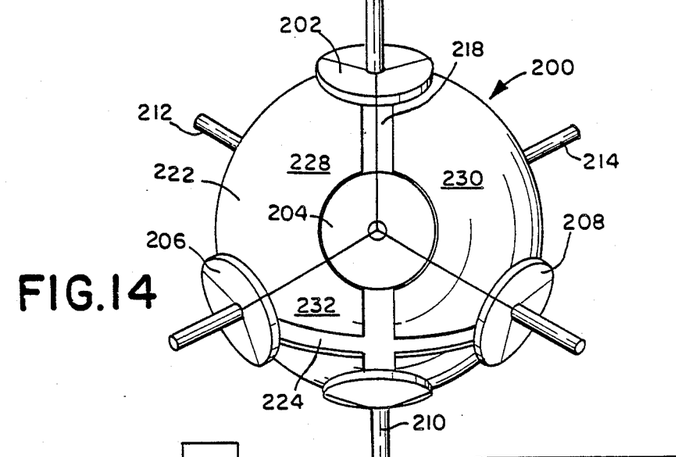
FIG. 14 depicts diagrammatically another preferred embodiment of the invention configured as a manipulable puzzle.

FIG. 14 depicts diagrammatically another embodiment of the invention configured as a manipulable, generally spherical, puzzle-type device 200. The construction of the device 200 is essentially identical to that of the molecular model device 22 and again includes a plurality, preferably three, concentric sphere means each defining at least a pair of intersecting great circle channels, preferably two, encircling the sphere means, the great circle channels of each sphere means prefera- bly intersecting each other perpendicularly and crossing under the great circle channels of each surrounding sphere means. The device 200 further includes a plurality of inserts, again preferably eight, which extend radially through the great circle channels of each of the plurality of sphere means. Again, each of the great circle channels of each of the sphere means receives at least one and preferably four of the inserts. The plurality of sphere means are again rotatable with respect to one another through movement of inserts along and transverse to the great circle channels.

FIG. 14 depicts most or all of four inserts 202–208 and parts of three others 210, 212 and 214 of the preferred eight inserts. The remaining insert is diametrically opposed to insert 204 and is not visible in this view. Three of the inserts 202, 204 and 210 are positioned in a first great circle channel 218 visible on the outer surfaoe 220 of the first or radially outermost sphere means 222 (see FIG. 15). Inserts 206, 208, 212 and 214 are located in the second great circle channel 224 of the first sphere means 222 which intersects the first great circle channel 218 perpendicularly. The outer surface 220 of the first or outermost sphere means 222 is divided by a plurality of unique indicia, such as different colors, into a plurality of different, contiguous areas by the indicia in those areas. In particular, picted, the outer surface 220 is divided into six different, contiguous areas of equal size. Three of these areas 228, 230 and 232 are visible in FIG. 14. Area 228 is bordered by inserts 202, 204, 206 and 212 and divides first channel 218 between inserts 202 and 204. Area 230 is bordered by inserts 202, 204, 208 and 214 and divides channel 218 between inserts 202 and 204 with area 228. Area 232 is bordered in FIG. 14 by inserts 204, 206, 208 and 210 and covers the portion of channel 218 extending between inserts 204 and 210 and the portion of channel 224 extending between inserts 206 and 208. Each of the eight inserts of the device 200 is of a substantially identical construction which will be discussed with respect to an exemplary insert, such as insert 204 centrally located in th figure.

Insert 204 includes a cover member 236 (see FIG. 15) visible on the outer surface 220 of the first sphere means 222 in the device 200 in FIG. 14. Again, the inserts are preferably positioned in a cubic orientation between "inversions" of the device 200. The cover member 236 in the cubic orientation lies at the intersection of three of the plurality of different, contiguous areas 228–232. The cover member 236 is marked with the indicia of each of the three areas 228–232 adjoining the insert 204 in the depicted particular arrangement of the inserts and particular angular orientation of each of the cover members of the inserts. In particular, the intersections of each pair of adjoining areas 228–230, 230–232 and 232–228 are continued onto the cover member 236 of insert 204 until those intersections intersect one another at the center of the cover member 236. Each other insert in the depicted configuration is similarly marked with the indicia of the three areas of the outer surface 220 of the first sphere means 222 adjoining that insert in one of the many potential configurations of the device 200 with the inserts in a cubic orientation. Thus, each insert includes a unique combination of three colors. This particular embodiment of the invention constitutes a "face" scheme in that each color represents generally one face of the imaginary cube formed by the inserts in the cubic arrangement. In this embodiment, a common color is shared by one third of each of the four cover members that border each common face. Of course, other arrangements of different indicia defining other combinations of plural, unique, contiguous areas are possible.

Figures 15, 16, 17:
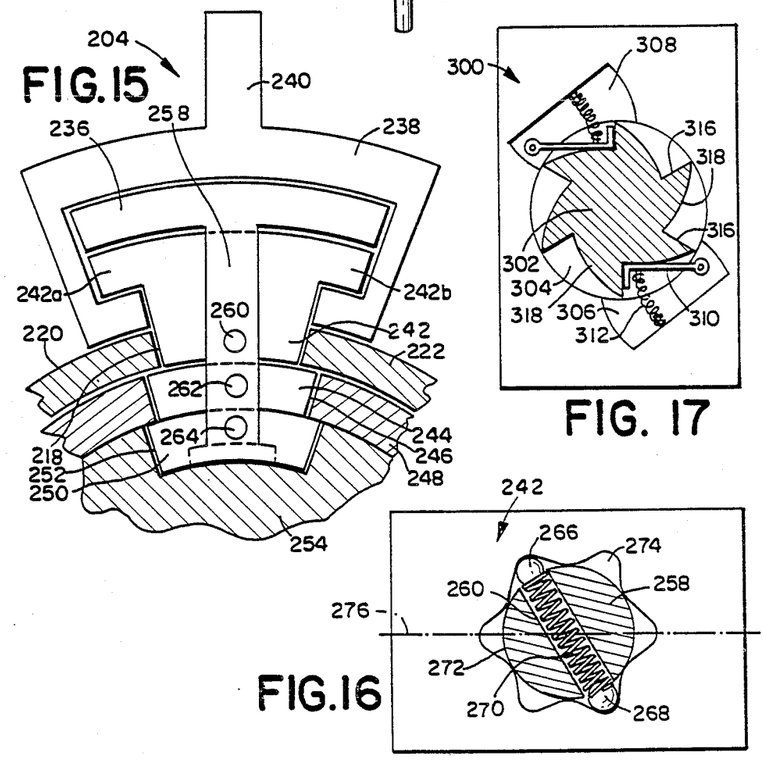
FIG. 15 depicts diagrammatically in side elevation view one of the inserts of the device of FIG. 14.
FIG. 16 depicts diagrammatically a plan section view of the insert of FIG. 15.
FIG. 17 depicts diagrammatically in plan view an alternative configuration of one of the insert members of the device of FIG. 14.

FIG. 15 depicts a preferred construction of insert 204. Constructions of the other inserts of the device 200 are identical. In addition to the cover member 236, the insert 204 preferably includes a transparent cap 238 having a central rod 240 protruding radially outwardly from the device 200 to assist in grasping the insert, a first member 242 received in the first great circle channel 218 of the first sphere means 222, a second member 244 received in a great circle channel 246 of the second sphere means 248 underlying the first sphere means 222 and a third member 250 received in a great circle channel 252 of a third sphere means 254 concentrically surrounded by the first and second sphere means 222 and 248. Extending radially inwardly into the device 200 from the cover member 236 is a dowel 258. The dowel 258 extends through the center of each of the first, second and third members 242, 244 and 250 for coupling the first, second and third members of the inserts together for rotation with respect to one another and with respect to the cover member 236. The dowel includes at least one and preferably three diametric bores 260–264, each bore being positioned along the dowel 258 at the height of one of the first, second and third members 242, 244 and 250.

FIG. 16 depicts the relationship between one of the central bores and one of the insert members, namely bore 260 and the first member 242. Bore 260 (and each of the other bores 262 and 264) includes a pair of spherical bearings 266, 268 which are outwardly biased from the bore by a centrally positioned compression coil spring 270. The first member 242 has a central opening 272 receiving the dowel 258. Six recesses 274 are formed in the central opening 272 at regular, 60° angular increments from one side of the major axis 276 of the member 242 around the dowel 258 to receive the spherical bearings 266, 268 when the first member 242 is oriented in one of the preferred ±60°,0°,−60° angular orientations with respect to the bore 260 (and with respect to the second and third members 244 and 250). A diametrically opposed pair of the recesses 274 lies along the major axis 276 which is parallel to the first great circle channel 218 along which the first member 242 moves. The remaining four recesses are located at ±60° angular increments to either side of that axis 276. The configurations of the second and third members 244 and 250 of each of the inserts is similar if central bores 262 and 264 are provided in the dowel 258 for biasing those members, as well. The geometry of the device 200 assures that the major axes of the members 242, 244, 250 will not be colinear even though the biasing means alone may permit such an orientation.

Manipulation of the puzzle 200 is similar to that previously described for the molecular model 22. A rod 240 is provided on each insert to assist in its manipulation. Again, the puzzle 200 is "inverted" by moving any or all of three of the inserts, such as the depicted inserts 202, 206 and 208 surrounding a centrally located insert (i.e. insert 204) away from the centrally located insert 204 and/or towards another insert (undepicted) diametrically opposed to the central insert 204 and/or by moving any or all of the remaining three inserts adjoining the other insert diametrically opposed to insert 204 away from that other insert and/or towards the central insert 204.

The provision of the transparent cap 238 on each of the inserts, covering the cover member 236 and extending under flange portions 242a, 242b of the first member, prevents deliberate rotation of the cover member 236 by the puzzle user. Preferably the cover member 236 is fixed to or is one piece with the dowel 258. The dowels 258 and hence the cover members 236 do not rotate during inversions. It is believed, under these conditions, that the depicted configuration of the puzzle device 200 is only one of 1,296 different possible orientations of the inserts and their indicia with respect to the plurality of different contiguous areas, and the only configuration in which each of the three indicia of each of the cover members of each of the eight inserts overlaps an identical one of the six different contiguous areas on the outer surface 220 of the device 200.

The two embodiments disclosed thus far include coupling means (central dowels) and biasing means (spring-biased bearings) which permit rotation of each of the insert members traveling in a great circle channel with respect to the central dowel. FIG. 17 depicts an alternative biasing means which is particularly useful for a puzzle embodiment of the device.

FIG. 17 depicts one exemplary rotatable insert member 300 and the cross-section of a specially configured central dowel 302. The member 300 includes a central bore 304 sufficiently large to receive the dowel 302. Recesses 306 and 308 are further provided in the member 300 on opposing sides of the bore 304. An arm 310 is pivotally mounted in each recess 306 and 308 with a spring 312 biasing the arm 310 towards the dowel 302 to form a pair of pawls. Lands 316 are provided at 60° intervals around the outer circumference of the dowel 302. Sloping surfaces 318 extend between the base and peak, respectively, of adjoining pairs of the lands 316. In this way a ratchet coupling is provided between the member 300 and the dowel 302. This ratchet construction permits the member 300 to rotate counterclockwise with respect to the dowel 302 without disturbing the angular orientation of the dowel 302. However, clockwise rotations of the member 300 cause similar clockwise rotations of the dowel 302. In puzzle embodiments of the invention at least two rotatable members would be provided on each insert and would be configured to rotate the dowel 302 in the same direction. Thus when the depicted member 300 turns counterclockwise or does not rotate about its center, while another member (not depicted) turns clockwise, the depicted member 300 does not turn the dowel 302. Rather, the dowel 302 is turned clockwise by the other member (not depicted) while the arms 310 ride up on the sloping surfaces 318 of the dowel 302 between the lands 316. In an inversion of the device, the dowel 302 and a connected cover member of the two "stationary" inserts do not rotate while the dowel 302 and connected cover member of each of the six "moving" inserts rotate 60°. It is believed that the device 200 of FIG. 14, with six separate surface areas and eight inserts incorporating three of the members 300 of FIG. 17, all the members ratcheting in the same direction, would have at least thousands of different, mechanically attainable configurations. This greater number of configurations is achieved due to the irreversible rotations of the cover members of six of the inserts during each inversion. Thus, an inversion with respect to the axis between one pair of diametrically opposed pairs of inserts followed by a reverse inversion with respect to the same axis results in 120° rotations of the cover members of the six moving inserts.

While two specific preferred embodiments have been disclosed, numerous modifications could be made to those devices and their components. For example, although only devices including eight movable inserts have been described, devices using other numbers of inserts are possible. For example, a simpler puzzle may employ only six freely movable inserts. This would still allow the device to perform inversions with respect to a "fixed" axis.

It is specifically noted that construction of either device 22 or 200 with only two concentric sphere means defining only two sets of perpendicularly crossing great circle channels, with inserts having only two rotatable members, and with a means of biasing the two rotatable members to angular orientations of +60°, −60°, and, optionally, 0° with respect to one another, is sufficient for permitting the performance of the inversions previously described, and for maintaining the inserts in a cubic orientation between inversions.

The only purpose of the approximately onequarter sphere curved segments 44–50 is to define the great circle channels of the sphere means. This could be accomplished by using skeletal quarter sphere segments, for example, each similar to a flat ring bent in half at about a 90° angle. The sides of each bent ring would define the sides of the great circle channels of that sphere means. Such elements could be held together by frame members to form a rigid innermost sphere of the device.

While separate, rotatable insert members have been described as being received in the great circle channels, the great circle channels of each sphere means need not intersect (i.e. have the same radius) and the inserts need not be movable members. For example, the inserts may merely have channel portions that can be received in selected great circle channels and passed along those channels regardless of the angular orientation of the channel portion around the insert. Thus, the channel portions could be washers, fixedly mounted on a central dowel and received in slot-like channels on the outer or inner surface of a sphere means, or plastically deformable portions of an insert.

Figure 2:
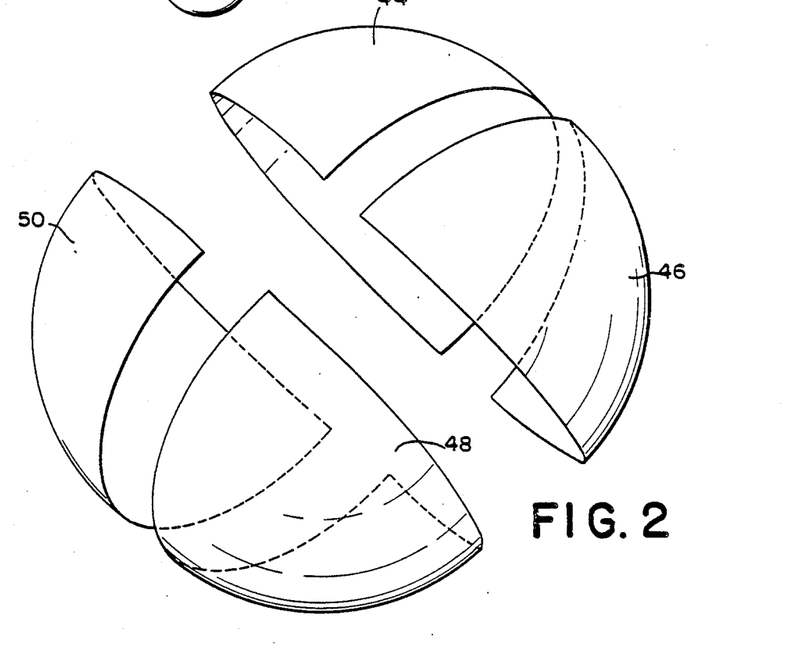
FIG. 2 depicts diagrammatically, in exploded form, one set of curved segments constituting a sphere means of the device of FIG. 1 and defining the reat circle channels of that sphere means.

While solid innermost sphere means 82 and 254 have been described, the innermost sphere means could be formed from curved, approximately quarter spherical segments like segments 44–50 of FIG. 2 and cap members or flanged innermost rotatable members used on the inside (radially innermost end) of each of the inserts to keep the spherical segments forming the innermost sphere means 82 or 254 from collapsing inwardly. As an alternative to caps or flanges on the inside ends of each insert, another sphere with a solid surface may be concentrically positioned within the quarter sphere curved segments forming the innermost sphere means defining great circle channels to prevent the inward collapse of those segments.

A molecular model using the above-described hollow construction could additionally be provided with the ability to displace the leaving "bond" with the attaching "bond". For example, a hole can be provided lengthwise through the central dowel 100 and cover member 92 of each of the inserts 56–70 of the molecular model embodiment 22 and an extra-long rod-like "bond" member 160 supporting the attaching "atom" inserted through the central dowel bore and hollow interior to displace the rod-like "bond" member supporting the departing "atom" from the insert currently retaining it.

It is specifically noted that the described rectangular shape of the first, second and third members of each insert is not a requirement, and other shapes, sizes and arrangements could be provided. Nor do the channels (or the rotating insert members that fit into them) have to be of equivalent width, depth or shape.

Numerous more complicated "coloration" schemes for the puzzle embodiments of the invention are possible. For example, it is possible to divide the spherical surface of a device of the invention into twelve unique, contiguous quadrilateral areas in which each unique color is shared by one third of each of the two cover members that define each edge of the imaginary cube formed by the inserts in the cubic arrangement. Each of those twelve areas can further be divided in half by the imaginary edges such that there would be 24 different areas, each area overlapping only a sixth of each of two cover members.

The coloration of the outer surface of the second, intermediate sphere means 248, visible through the first and second great circle channels 218 and 224, respectively, can be omitted if desired. Moreover, a monochromatic embodiment can be used simply as a manipulable toy device.

The biasing means can be provided between any pair of the first, second and third members 86–90, either directly between those members themselves, like the biasing means of the inserts of the described molecular model device 22, or indirectly through the mediacy of an independent central dowel, like the biasing means of the inserts of the described puzzle device 200.

Although a central dowel has been described as the preferred coupling means in each of the two described embodiments for coupling the first, second and third members of each insert together for rotation with respect to one another, other arrangements are possible including the rotation of one or more of the first, second and third members on and/or around one another or others of the members.

Preferably, the central dowel 258 of the puzzle device 200 is also fixedly connected with the cover member 236 permitting the first, second and third members 242, 244 and 250 to rotate thereabout. However, if desired, the central dowel 100 of the molecular model device 22 may be fixedly secured to any one of the first, second, third or fourth (cover) members 86–92.

In this regard, the biasing means of FIGS. 15 and 16 could be used in the atom model 22 embodiment of the invention. An even more simple construction would be to fixedly couple the dowel to one channel portion member of each insert and provide a second channel portion member with cutouts like cutouts 274 of FIG. 16. The two cutouts spanning the major central axis 276 could also be eliminated, if desired. Preferably, with this construction the cover member of the insert would be rotatably coupled to the central dowel.

While a ratchet construction for a puzzle device wherein all the rotatable members of all the inserts ratchet in the same direction has been described, alternative constructions wherein all the rotatable members of some of the inserts ratchet in the opposite direction are also possible.

From the foregoing description, it can be seen that the present invention can provide a variety of educational devices including manipulable puzzles and components of molecular models for demonstrating certain chemical reaction mechanisms, namely Walden inversions. It will be recognized by those skilled in the art that changes could be made to the above-described embodiments of the invention. in addition to those already mentioned, without departing from the broad, inventive concepts thereof. It is understood, therefore, that this invention is not limited to the particular embodiments disclosed, but is intended to cover all modifications which are within the scope and spirit of the invention, as defined by the appended claims.

I claim:

1. An educational device comprising:
   first sphere means for defining at least first and second crossing great circle channels;
   second sphere means concentrically surrounded by the first sphere means for defining at least third and fourth great circle channels crossing each other and crossing under the first and second great circle channels;
   a plurality of inserts extending radially at least from the second sphere means through the first sphere means, a first channel portion of each insert being received in and movable along one of the first and second great circle channels and a second channel portion of each insert being simultaneously receivable in and movable along one of the third and fourth great circle channels, the plurality of inserts being arranged such that each o the great circle channels receives at least one of the inserts; and
   at least one of the first and second sphere means being rotatable with respect to the other of the sphere means through movement of the inserts.

2. The device of claim 1 wherein the first channel portion or each insert comprises a first member, the second channel portion of each insert comprises a separate second mumber and each insert further comprises cover coupling means for coupling the first and second members of the insert together for rotation with respect to one another.

3. The device of claim 2 further comprising means for biasing one of the members of each insert to a plurality of predetermined angular positions.

4. The device of claim 3 wherein the means for biasing further biases the first and second members to at least one predetermined angular orientation with respect to one another corresponding to an angle at which the great circle channel receiving the first member of the insert crosses the great circle channel receiving the second member of the insert.

5. The device of claim 1 wherein each insert further includes means for removably receiving and supporting a member extending radially outwardly from the device.

6. The device of claim 1 wherein at least one of the first and second sphere means is formed by four unconnected segments, each segment being approximately one-quarter of a hollow sphere.

7. The device of claim 6 wherein each one of the first and second sphere means is formed by four unconnected segments, each segment being approximately one-quarter of a hollow sphere.

8. The device of claim 1 wherein the first sphere means has an outer surface divided into a plurality of different, contiguous areas by unique indicia in each of the areas.

9. The device of claim 8 wherein each insert includes a cover member covering part of the great circle channel of the first sphere means receiving the insert and wherein each of the cover members has indicia corresponding to the indicia of areas adjoining the cover member in one particular configuration of the inserts and particular angular orientation of each cover member such that each cover member has unique combination of different indicia.

10. The device of claim 1 wherein each insert includes a third channel portion radially inwardly positioned from the second channel portion.

11. The device of claim 10 further comprising a third sphere means concentrically surrounded by the first and second sphere means for defining at least fifth and sixth great circle channels crossing each other and crossing under the first, second, third and fourth great circle channels, each of the fifth and sixth great circle channels receiving the third channel portion of at leastone of the inserts.

12. The device of claim 11 wherein each of the three sphere means has only two great circle channels and the two great circle channels of each sphere means cross one another perpendicularly.

13. The device of claim 11 having eight of the inserts.

14. The device of claim 11 wherein at least one of the portions of each insert is a member rotatable on the insert around an axis of rotation and wherein each insert further comprises biasing means for biasing the one member to a plurality of regular angular positions around the axis of rotation.

15. The device of claim 14 wherein the biasing means biases the one member to a plurality of angular orientations, each of the angular orientations of the plurality being angularly spaced from the other angular orientations of the plurality by multiples of 60°.

16. The device of claim 14 wherein the second and third portions of eaoh insert are separate members and wherein each insert further comprises a fourth, cover member positioned radially outwardly from the first member and rotatable with respect to each of the first, second and third members of the insert.

17. The device of claim 16 wherein the first sphere means has an outer surface divided by different indicia into a plurality of unique, contiguous areas.

18. The device of claim 17 wherein the cover member of each insert covers part of the great circle channel of the first sphere means receiving the insert and portions of the outer surface adjoining the insert, wherein the areas of the outer surface of the first sphere means adjoin each of the cover members and wherein each of the cover members has indicia similar to the indicia of each of the areas adjoining the insert in one particular arrangement of the inserts and particular angular orientation of each of the cover members of the inserts whereby each cover member has a unique combination of different indicia.

19. The device of claim 11 wherein each insert subtends an angle in each of the three sphere means of no greater than about 60°.

20. An educational device comprising:
   a first hollow sphere means for defining first and second great circle channels crossing each other at right angles;
   a second sphere means concentrically located within the first hollow sphere means for defining third and fourth great circle channels crossing beneath the first and second great circle channels;
   eight inserts, each insert including a first channel portion received in and movable along one of the first and second great circle channels and a second channel portion received in and movable along one of the third and fourth great circle channels;

at least the first hollow sphere means being formed by at least four separate segments held together with the inserts; and the inserts being manipulable into a generally cubic orientation on the device forming two mutually exclusive, tetrahedrally arranged sets of inserts, the inserts further being manipulable such that three inserts of either one of the exclusive sets can be shifted from the tetrahedral orientation with respect to the fourth insert of the one set to a tetrahedral orientation with respect to an insert of the other set diametrically opposed to the fourth insert of the one set.

* * * * *

UNITED STATES PATENT AND TRADEMARK OFFICE
CERTIFICATE OF CORRECTION

PATENT NO. : 4,877,406

DATED : October 31, 1989

INVENTOR(S) : Howard J. Wilk

Page 1 of 3

It is certified that error appears in the above-identified patent and that said Letters Patent is hereby corrected as shown below:

In the Abstract:

Line 7 of the text, change "circule" to --circle--.

In the Specification:

Col. 1, line 36, change "NeWman," to --Newman,--;
Col. 2, line 28, change "reat" to --great--;
Col. 2, line 41, delete "1;";
Col. 3, line 28, change "angl," to --angle,--;
Col. 3, line 32, change "109°" to "109°" in light face type;
Col. 3, line 40, change "onequarter" to --one-quarter--;
Col. 3, line 62, change "t" to --to--;
Col. 4, line 6, change "2" to "22";
Col. 4, line 26, change "radiallY" to "radially";
Col. 5, line 21, delete the second parenthesis after "inner-most";
Col. 5, line 63, change "walden" to --Walden--;
Col. 6, line 11, change "suraace" to --surface--;
Col. 6, line 22, change "60" to --60°-- in light face type;
Col. 6, line 26, change "12" to "124";
Col. 7, line 7, change "I48" to "148";
Col. 7, line 11, change "±60." to --±60°--;
Col. 8, line 23, after "nucleophile" insert --(Nu) displaces the hydroxide or some group that the hy- --;
Col. 8, TABLE I, substitute the following equation for the last equation spanning lines 55 through 58:

UNITED STATES PATENT AND TRADEMARK OFFICE
CERTIFICATE OF CORRECTION

PATENT NO. : 4,877,406

DATED : October 31, 1989

INVENTOR(S) : Howard J. Wilk

It is certified that error appears in the above-identified patent and that said Letters Patent is hereby corrected as shown below:

```
Col. 8, line 66, insert --. The-- at the end of the line;
Col. 9, line 4, delete " "- " at the end of the line;
Col. 9, line 5, insert --"-- before " hands" ";
Col. 9, line 9, change "lace" to --place--;
Col. 9, line 17, change numeral "0" to capital letter --O--
        in light face type;
Col. 9, line 24, change "AcO-" to "AcO⁻";
Col. 9, line 26, insert a comma (--,--) after "fact" and
        after "retention";
Col. 9, line 43, change "on" to --one--;
Col. 10, line 18, change "surfaoe" to --surface--;
Col. 10, line 26, delete "picted," and substitute --in the
        preferred embodiment of the invention depicted,--
        therefor;
Col. 10, line 40, change "th" to --the--;
Col. 11, line 40, change "+" to --±--;
Col. 13, line 14, change "biaming" to --biasing--;
Col. 13, line 20, change "onequarter" to --one-quarter--;
Col. 14, line 16, change "24" to "24" in light face type;
Col. 14, line 56, change "rotatabIy" to "rotatably";
Col. 15, line 2, change the period to a comma;
Col. 15, line 5, change "iimited" to --limited--;
```

In the Claims:

```
Claim 1, Col. 15, line 26 of the Patent, change "o" to
        --of--;
Claim 2, Col. 15, line 32 of the Patent, change "or" to
        --of--;
Claim 2, Col. 15, line 33 of the Patent, delete the comma
        after "second";
Claim 2, Col. 15, line 34 of the Patent, change "mumber" to
        --member--;
Claim 9, Col. 16, line 3 of the Patent, after "has" insert
        --a--;
```

UNITED STATES PATENT AND TRADEMARK OFFICE
CERTIFICATE OF CORRECTION

PATENT NO. : 4,877,406

DATED : October 31, 1989

INVENTOR(S) : Howard J. Wilk

It is certified that error appears in the above-identified patent and that said Letters Patent is hereby corrected as shown below:

Claim 11, Col. 16, line 14 of the Patent, change "leastone" to --least one--;

Claim 16, Col. 16, line 33 of the Patent, change "eaoh" to --each--; and     Claim 20, Col. 16, line 62 of the Patent, after "crossing" insert --each other at right angles and crossing--.

Signed and Sealed this

Third Day of September, 1991

Attest:

HARRY F. MANBECK, JR.

*Attesting Officer*    *Commissioner of Patents and Trademarks*